United States Patent [19]
Rohr et al.

[11] 3,920,829
[45] Nov. 18, 1975

[54] INFLAMMATION INHIBITING BIS-CARBAMATE COMPOSITION

[75] Inventors: Wolfgang Rohr, Mannheim; Albrecht Franke, Ludwigshafen; Hubert Giertz, Limburgerhof; August Amann, Ludwigshafen, all of Germany

[73] Assignee: Badische Anilin- & Soda-Fabrik Aktiengesellschaft, Ludwigshafen (Rhine), Germany

[22] Filed: Aug. 30, 1972

[21] Appl. No.: 284,760

[52] U.S. Cl. .............................. 424/300; 260/471 C
[51] Int. Cl.² ........................................ A61K 31/27
[58] Field of Search ................. 260/471 C; 424/300

[56] References Cited
UNITED STATES PATENTS

| | | | |
|---|---|---|---|
| 3,399,265 | 8/1968 | Szabo | 424/300 |
| 3,450,745 | 6/1969 | Payne et al. | 424/300 |
| 3,546,343 | 12/1970 | Payne et al. | 424/300 |

Primary Examiner—Jerome D. Goldberg
Attorney, Agent, or Firm—Johnston, Keil, Thompson & Shurtleff

[57] ABSTRACT

P-aminophenol-bis-carbamate derivatives which are suitable as active ingredients in drugs, particularly for inhibiting inflammation, the production of such active ingredients, and drug formulations containing the active ingredients.

2 Claims, No Drawings

INFLAMMATION INHIBITING BIS-CARBAMATE COMPOSITION

The invention relates to new bis-carbamates whose structure is derived from p-aminophenol and to their production. The compounds have valuable pharmacological properties and are therefore suitable as active ingredients in drugs, particularly for inhibiting inflammation.

The new compounds have the formula:

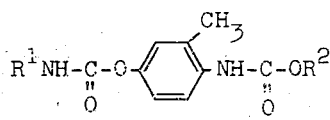

in which $R^1$ and $R^2$ are identical or different aliphatic radicals which may bear phenyl as a substituent.

The unsubstituted or substituted aliphatic radical may be linear, branched or cyclic, saturated or unsaturated. Examples of aliphatic radicals are accordingly alkyl radicals, particularly alkyl of one to six carbon atoms such as methyl, ethyl, propyl, isopropyl, butyl, isobutyl, s-butyl, t-butyl, pentyl and hexyl. The cyclic aliphatic radicals may be those of five to eight carbon atoms, for example the cyclopentyl, cyclohexyl and cyclooctyl radicals. The cycloaliphatic radicals may also be bis-cycles or endo-cycles. Phenyl is the preferred substituent of the aliphatic radical, an example being benzyl. The radicals may have one or more unsaturations, and may contain double bonds or triple bonds such as in the allyl, methallyl, buten-(1)-yl-(3), buten-(2)-yl-(3), propargyl, butyn-(1)-yl-(3), butyn-(2)-yl-(3) or 3-methylbutyn-(1)-yl-(3) radical.

Compounds having alkyl of one to four carbon atoms, cycloalkyl of five to eight carbon atoms, particularly cyclohexyl, and benzyl are preferred as $R^1$. Lower alkyl, i.e. of one to about four carbon atoms, particularly methyl is preferred as the radical $R^2$.

The new compounds may be prepared for example by the following methods:
by reaction of 2-methyl-4-hydroxyphenylcarbamates of the general formula:

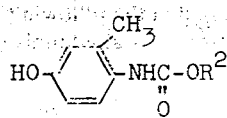

(which may be in the form of an alkali metal salt)
a. with an isocyanate of the formula $R^1N=C=O$ or
b. with a carbamyl chloride of the formula

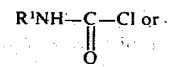

c. with phosgene to form the corresponding chloroformate which is then condensed with an amine derivative of the formula: $R^1NH_2$
or by reaction of
d. 3-methyl-4-nitrophenol with an isocyanate of the formula $R^1N=C=O$ to form a 3-methyl-4-nitrophenyl carbamate of the formula:

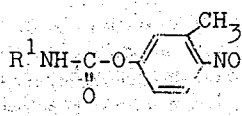

whereupon the nitro group is reduced, the resultant amine converted into the isocyanate of the formula

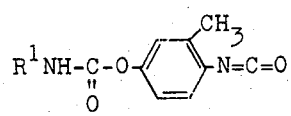

and this reacted with an alcohol to form the desired carbamate,
or
e. by reaction of 3-methyl-4-nitrophenol with phosgene with the formation of 3-methyl-4-nitrophenyl chloroformate:

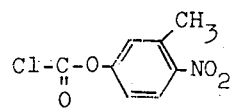

followed by reaction with an amine derivative of the formula:
$R^1NH_2$ to form a 3-methyl-4-nitrophenyl carbamate which as described under (d) is converted via the stage of the amine and the isocyanate into the desired carbamate, $R^1$ and $R^2$ in the general formulae under (a) to (e) having the meanings given above.

The reaction according to (a) is conveniently carried out in an organic solvent, for example tetrahydrofuran or chloroform and if desired with the addition of a catalyst, preferably an organic base, for example triethylamine.

Reaction according to (b) is conveniently carried out in an organic solvent, for example pyridine or methyl isobutyl ketone, with or without the addition of an acid-binding agent such as an organic base, for example a tertiary amine, preferably triethylamine, or inorganic bases, for example caustic soda solution.

Reaction with phosgene according to (c) is carried out conveniently in an organic solvent, for example ethyl acetate or dichloroethane and at a temperature of from about 0° to 50°C, if desired with an addition of an inorganic or organic base, for example caustic soda solution or N,N-dimethylaniline. For the further reaction according to (c) with the amine an excess of the same may be used as reaction medium or water or an organic solvent. it is convenient to add an acid-binding agent, for example an organic or inorganic base such as triethylamine or sodium carbonate.

For the reaction according to (d) the first stage is conveniently carried out in an organic solvent, for example tetrahydrofuran or ethyl acetate and if desired with the addition of a catalyst, preferably an organic base, for example triethylamine. The following reduction stage may be carried out by a conventional method, for example by catalytic reduction or by treating 3-methyl-4-nitrophenyl carbamate with another reducing agent such as hydrogen sulfide or sodium sulfide. The amine obtained is converted by a conventional method into the corresponding isocyanate, for example by reaction with phosgene in an inert organic solvent such as tetrahydrofuran or ethyl acetate, if desired in the presence of an acid-binding agent, preferably a tertiary organic base such as triethylamine.

Reaction with phosgene according to method (e) is conveniently carried out in an inert organic solvent, for example ethyl acetate or 1,2-dichloroethane at a temperature of from about 0° to 50°C, if desired in the presence of an inorganic or organic base such as caustic soda solution or N,N-dimethylaniline. Further reactions according to method (e) to form the desired carbamate are carried out under the reaction conditions specified under (c) and (d).

The 2-methyl-4-hydroxyphenyl carbamates necessary for the reactions (a) to (c) as starting materials may be prepared for example by reaction of 2-methyl-4-hydroxyaniline with a chloroformate in water or an organic solvent such as dichloroethane with the addition of an inorganic base such as sodium bicarbonate or an organic tertiary base such as triethylamine.

The new compounds have valuable pharmacological properties. In particular, they act as inflammation inhibitors, anodynes and febrifuges. They also act on the central nervous system and are capable of decisively increasing the separation of sodium ions in urine. The substances have low toxicity and do not cause any change in haemoglobin.

The inflammation inhibiting and analgesic effects have been compared with those of phenacetin. There is clearly stronger inflammation inhibiting effect but the analgesic effect is not increased. The fact that the compounds according to the invention, in a dosage which in the case of phenacetin causes severe methaemoglobinemia, does not affect haemoglobin is particularly important.

The compounds may be applied in conventional peroral formulations. The active ingredients of this invention may be combined with other active ingredients and may also be used together with phenacetin.

The production of the new compounds is illustrated in the following Examples.

EXAMPLE 1

N-(2-methyl-4-benzylcarbamoyloxyphenyl)-methyl carbamate

A solution of 18.5 parts by weight of N-(2-methyl-4-hydroxy-phenyl)-methyl carbamate in 80 parts by weight of tetrahydrofuran has added to it 0.5 part by weight of triethylamine and 14 parts of benzyl isocyanate while stirring at 20°C. The reaction mixture is stirred for five hours at 50°C to complete the reaction. The deposited reaction product is suction filtered and together with the fraction obtained from the mother liquor by concentration is recrystallized from ethyl acetate. Melting point 144° to 147°C.

The compound has the following structural formula

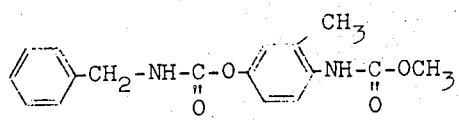

It has been extensively tested and found to be particularly important.

The following compounds may be obtained in an analogous manner:

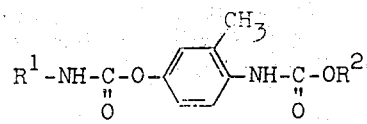

| Example | R¹ | R² | m.pt. °C |
|---------|----|----|----------|
| 2 | $CH_3$ | $CH_3$ | 138 to 141 |
| 3 | $C_2H_5$ | $CH_3$ | 126 to 128 |
| 4 | n—$C_3H_7$ | $CH_3$ | 127 to 128 |
| 5 | cyclohexyl | $CH_3$ | 190 to 192 |
| 6 | benzyl | $C_2H_5$ | 139 to 142 |
| 7 | benzyl | i—$C_3H_7$ | 150 to 152 |
| 8 | 3—methylbutyn—1—yl—3 | $CH_3$ | 153 to 155 |
| 9 | ditto | $C_2H_5$ | 129 to 132 |
| 10 | ditto | i—$C_3H_7$ | 149 to 152 |

The N-(2-methyl-4-hydroxyphenyl)-methyl carbamate used as starting substance may be obtained in the following manner:

A mixture consisting of 49.2 parts by weight of 4-amino-3-methylphenol, 300 parts by weight of dichloroethane and 35.3 parts by weight of sodium bicarbonate is heated to 35°C and 39.7 parts by weight of methyl chloroformate is added over 2 hours. The whole is stirred for another 2 hours at 35°C for further reaction. The cold reaction mixture is treated with dilute hydrochloric acid and water, and the organic phase is dried with magnesium sulfate and then concentrated in vacuo. The dark colored residue is recrystallized from benzene with an addition of activated charcoal. Melting point: 93° to 96°C.

The inflammation inhibiting properties are determined according to the method of C. A. Winter, E. A. Risley and G. W. Nuss described in Proc. soc. Exp. Biol. Med., 111, 544 (1962). In this method an inflammatory swelling is produced in the hind paw of rats by injection of carrageenin, which can be lessened or prevented by inflammation inhibiting substances. This lessening is expressed in the following Table as oedema inhibition in % after peroral administration:

$$R^1-NH-\underset{\underset{O}{\|}}{C}-O-\underset{CH_3}{\underset{|}{\bigcirc}}-NH-\underset{\underset{O}{\|}}{C}-OR^2$$

| R¹ | R² | Oedema inhibition in % on peroral administration of — mg/kg | | | | |
|----|----|----|----|----|----|----|
| | | 400 | 200 | 100 | 50 | 20 |
| $CH_3$ | $CH_3$ | | | 50 | 43 | 35 |
| $C_2H_5$ | $CH_3$ | | | 27 | 10.5 | — |
| n—$C_3H_7$ | $CH_3$ | | | 54 | 35 | 30 |
| $C_6H_5$—$CH_2$ | $CH_3$ | | | 59 | 50 | 38 |
| phenacetin | (commercial grade) | 74 | 46 | 27 | | |

We claim:
1. An inflammation inhibiting composition comprising an effective anti-inflammation amount of N-(2-methyl-4-benzyl-carbamoyloxyphenyl)-methyl carbamate in a perorally administrable drug formulation.

2. An inflammation inhibiting composition comprising an effective anti-inflammation amount of N-(2-methyl-4-propyl-carbamoyloxyphenyl)-methyl carbamate in a perorally administrable drug formulation.

* * * * *